July 10, 1962  C. J. PAVLIK ETAL  3,043,612
FLEXIBLE MOLDED HOSE
Filed Dec. 22, 1958

INVENTORS
Charles J. Pavlik
Paul A. Songer
BY
John E. Reilly

United States Patent Office 3,043,612
Patented July 10, 1962

3,043,612
FLEXIBLE MOLDED HOSE
Charles J. Pavlik and Paul A. Songer, Denver, Colo., assignors to The Gates Rubber Company, Denver, Colo., a corporation of Colorado
Filed Dec. 22, 1958, Ser. No. 781,992
3 Claims. (Cl. 285—226)

This invention relates to flexible hose, and more particularly has relation to flexible, non-collapsible hose adaptable for division into any desired length for sealed connection at the ends thereof into a heater installation and the like.

In the formation of flexible, non-collapsible hose it is customary to provide the hose with outwardly projecting convolutions for collapse resistance. Where it is desired to form helically wound convolutions it is customary to reinforce the convolutions with a spirally extending wire element either imbedded or disposed along the interior of the hose just beneath the convoluted sections of the hose. As an alternative the hose may be formed with a number of separate circumferential convolutions wherein metal rings are utilized as a reinforcement element to support the convoluted portions against collapse.

For many hose applications, however, it is desirable to form the hose in such a way as to not only secure the necessary flexibility and collapse resistance, but also to provide adequate burst resistance and additionally to so form the convolutions as to permit the hose to be separated into a number of individual lengths depending upon the length of hose desired for a particular application. In providing for a single hose length which is divisible into a number of separated parts, it is of course essential that at the point of division provision is made for clamping means to engage the outer surface of the hose and to establish a sealed connection with the inlet and outlet fittings to and from the hose respectively. However, to insure a sealed connection at the ends of the hose upon division it is of course greatly preferred to incorporate circumferentially extending convolutions in contrast to helical convolutions so that a cylindrical surface may be provided between the convoluted portions for sealed connection of the ends of the hose. At the same time, the cylindrical surface between the convoluted portions must be of sufficient length to accommodate various types of clamping means and of various sizes to insure adequate connection in each particular application. However, by reinforcing the body of the hose only at the convoluted portions there is a difficulty that the hose is not reinforced in any way between the convolutions and, where desired to utilize the hose as a pressure line of any type, there is a danger of bursting the body of the hose along the unreinforced clamp receiving sections. Moreover, it is often impractical to provide rigid reinforcing elements throughout the clamp receiving sections since the hose at these points must be as flexible as possible to insure a sealed connection. In addition, the use of separate reinforcing elements is expensive and makes fabrication of the hose very time consuming and inefficient.

In accordance with the present invention it is proposed to form the hose in such a way as to secure the desired flexibility and collapse resistance preferably through the use of circumferentially extending, axially spaced convolutions and, in situations where the hose is to be employed as a pressure line to enable reinforcement of the hose throughout its length, to provide the necessary resistance to burst; and also, in doing so, to enable formation of the hose in an efficient and inexpensive manner. Moreover, it is proposed to so design the hose that the convoluted sections of the hose may be spaced axially apart a sufficient distance to form clamp receiving sections between the convoluted sections which are of a sufficient length and flexibility, notwithstanding the incorporation therein of a reinforcement layer to insure a sealed connection at the divided end portion; and furthermore, wherein the clamp receiving sections may be so formed as to accommodate various types and sizes of clamping means for sealed connection at the ends thereof for any desired length of hose.

It is therefore an object of the present invention to produce a hose in which provision is made for optimum flexibility and collapse resistance so as to permit manipulation, especially bending, of the hose while maintaining a constant diameter; and further, wherein the hose is so constructed and arranged as to be divisible and connectable in sealed relation at any desired points along its length.

It is another object to provide for a flexible, non-collapsible hose in which the body of the hose is defined by a plurality of spaced circumferential convolutions separated by a corresponding number of clamp receiving surfaces and wherein the body of the hose is so constructed and arranged as to provide for optimum flexibility, collapse and burst resistance throughout the length thereof.

It is a further object to provide in a convoluted hose a reinforcing layer extending continuously throughout the length of the hose to provide for optimum burst resistance without affecting the flexibility and collapse resistance of the hose.

It is still a further object to provide for a reinforced hose in which the body of the hose is defined by a series of exterior convoluted surfaces divided by generally flat clamp receiving surfaces and wherein the clamp receiving surfaces are so constructed and arranged as to insure improved pressure resistance and at the same time to enable sealed connection of the hose at any desired point between the convoluted surfaces.

It is an additional object to provide for an improved hose construction and method of making the same where the hose may be more efficiently yet inexpensively fabricated to obtain greatly improved burst resistance throughout the length of the hose in combination with improved collapse resistance and flexibility.

The above and other objects of the present invention will become more apparent from the following detailed description taken together with the accompanying drawings, in which.

Figures 1, 2:
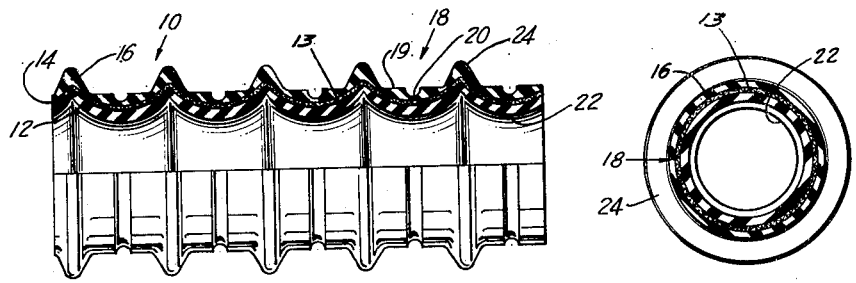
FIGURE 1 is a view partially in section of a preferred form of the present invention.
FIGURE 2 is an end view of the hose section shown in FIGURE 1.

Referring more particularly to the drawings there is shown by way of illustrative example in FIGURES 1 and 2 a molded flexible hose 10, wherein the body of the hose is broadly comprised of an inner liner 12, a friction layer 13, a fabric reinforcing layer 14, and a cover 16.

A primary feature of the present invention is in the configuration of the hose apart from the materials and method employed in forming the hose. In many applications, such as in heater installations, it is desirable that the hose be highly flexible yet collapse resistant; in addition, the hose at each end must be so designed as to permit a clamp to be applied thereto for sealed connection of the hose ends onto suitable fittings. Moreover, it is often desirable to form the hose in long lengths to permit the individual to cut the hose to the desired length depending upon his particular requirements. To this end, the hose of the present invention is made up of relatively long clamp receiving sections 18, each having a generally cylindrical surface 19 to enable disposition of clamps of various desired widths and further including at some intermediate point along its length an indented area preferably in the form of an annular groove 20 to accommodate a spring-type clamp where desired. In order to provide for easy insertion of a fitting into any desired clamp receiving section yet at the same time insure a sealed connection, the inner surface of the hose body forming the inside of the clamp receiving sections is of a generally convex form, as at 22, such that the body of the hose curves inwardly to form a relatively thick cross section at a point below the groove 20 and is directed outwardly between each clamp receiving section along the inner surface of the hose.

At the point between each of the clamp receiving sections 18 the body of the hose is directed outwardly to form a number of axially spaced, circumferentially extending ribs or convolutions 24. At the convoluted sections 24 the exterior surface of the hose is generally convex although in accordance with conventional practice the configuration of the convolutions may assume any variety of forms. At the same time the inner surface of the hose at the convoluted sections is formed by the intersection of the outwardly directed convex surfaces 22 of the clamp receiving sections, and in this connection, it will be noted that the inner convex surfaces intersect to form a circumferential line of intersection located intermediately between each rib and are of a diameter substantially the same as the clamp receiving surfaces. In this way, it will be noted that the body of the hose is of substantially uniform thickness throughout except for the relatively thick cross sectional area found adjacent the annular grooves 20, and at the same time, is so formed as to provide a hinge point formed by the line of intersection of the inner surface of the hose at each rib to permit optimum flexibility without weakening the hose adjacent to the rib sections. Although the extent of outward projection of the ribs 24 is not critical, it has been found preferable that the intersection of the convex surfaces be of a diameter substantially equal to that of the cylindrical or clamp receiving surfaces of the hose. The reason for this is that in extending the line of intersection outside the normal hose diameter the thickness of the rib section will be substantially decreased; whereas, in forming the line of intersection inside the normal diameter of the hose the body will not retain optimum flexibility since the point of bending or hinge point will not be as clearly defined.

In forming the hose of the present invention, the individual layers may be applied to form a tube or hose length having a diameter substantially equal to the normal outside diameter of the clamp receiving sections 18, after which the hose may be molded in accordance with general practice into the desired configuration. In forming the individual layers, the inner liner 12 may be first extruded from an elastomeric material, such as a conventional rubber or plastic, in a tuber installation. The extruded tube forming the liner may also include suitable additives, along with a lubricant coating applied to the inner surface thereof to enable ease of handling during subsequent forming operations. For some applications it may be desirable to provide some heat resisting layer in the body of the hose, and although such in itself does not form part of the present invention, it may be suitably applied over the inner liner in the form of a flat metallized rubber sheet to form the friction liner 13. The friction liner 13 is preferably applied just prior to passage of the tube forming the liner 12 through a suitable knitting machine and just in front of the knitting head, so that as the flat calendered strip forming the friction liner 13 is applied a stretched fabric may be applied in the form of a continuous reinforcement layer 14 around the friction liner 13 to fold the liner into position in the form of a tube to embrace the inner liner 12. The reinforcing layer of course may be formed in various other suitable ways and of various materials, the primary consideration being that the layer 14 may be subsequently distended in the molding operation so as to follow the contour of the hose throughout the clamp receiving sections 18 and rib sections 24. In this connection, it has been found preferable to use any fabric of the open weave type, that is, where the angular disposition of the threads forming the fabric may be altered as the hose is increased in diameter to form the convoluted sections. For example, the reinforcement layer may be in the form of a plain or lock stitch knitting construction, or a loosely braided layer, or by wrapping a cord in a conventional manner about the liner at a low angle with respect to the longitudinal axis of the hose.

Following the application of the reinforcement layer, a cover may be suitably applied over the reinforcement layer, such as by means of an insulator. The uncured hose may then be cut to the desired mold lengths, then slid over a suitable perforated hollow mandrel or similar support. The mandrel and associated hose length may then be inclosed within a mold cavity formed to the desired exterior configuration of the finished hose. In FIGURE 1 it is to be noted that with a mold cavity formed to provide the desired exterior configuration that the covered layer 16 will be substantially modified in cross section, under the application of heat and pressure, so as to form a relatively thick section throughout the flat receiving sections 18, then will be thinned out at the point of outward extension into the convolutions 24. Of course, forming the indented areas 20 will contribute to the added thickness in the clamp receiving sections, so that the undersurface of the cover will assume a generally rounded form; whereas the outer surface is generally flat except for the indented area 20. In turn, the inner liner 12 will not be so affected by the configuration of the mold cavity except to follow the general contour of the cover as it is projected outwardly into spaces in the mold cavity forming the convoluted portions 24, and the liner surfaces between the rib sections will be generally rounded or convex in following the general form of the undersurface of the cover 16. Also, it will be noted that the convex inner surfaces 22 forming the corrugated series throughout the length of the hose intersect rather sharply at a point generally midway between the rib sections, and, of course, the diameter of these circumferential lines of intersection may be controlled by the extent of projection of the hose length outwardly to form the convoluted sections 24. Of course the reinforcement layer 14 will contribute to the overall design of the hose during the molding operation in that it will tend to move outwardly in a uniform manner upon application of heat and pressure through the mandrel so as to maintain a uniform thickness in the inner layer onwithstanding the variation in thickness in the cover layer 16 as it is forced out into the mold cavity.

In a modified form of molding the hose, an expansible jacket, not shown, may be substituted for the more rigid, perforated hollow mandrel hereinbefore described, the jacket being formed in accordance with conventional practice such that on application of steam through the perforated sections the jacket will expand outwardly to force the outer surface of the hose into the mold cavity while at the same time the jacket itself expands outwardly into a configuration to form the desired contour of the inner surface of the hose. This method may be preferred especially where a continuous reinforcement layer is not employed between the inner liner 12 and the cover 16.

Figures 3, 4:
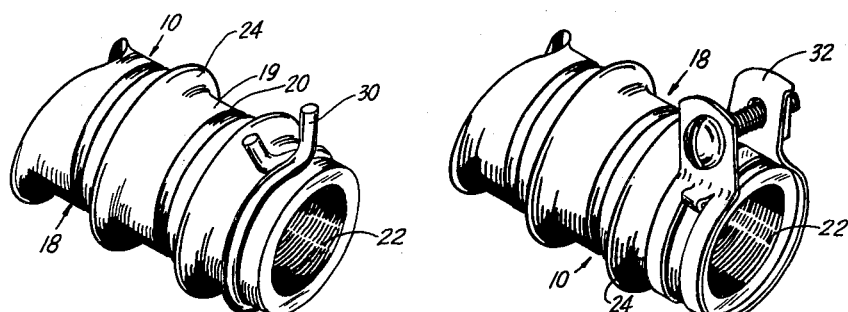
FIGURE 3 is a perspective view illustrating one form of clamp which may be employed in sealing one end of the hose in accordance with the present invention.
FIGURE 4 is a perspective view illustrating the use of another type of suitable clamp for sealed disposition over the end of the hose.

The finished hose may then be supplied to various dealers or individuals, for example, in 6 ft. lengths or greater, without the necessity of separating the hose into individual lengths. It is realized that this is more or less conventional practice for many applications. However, the hose constructed in accordance with the present invention has particular application to installations where it is desirable to utilize various types or designs of exterior clamping means on a highly flexible, collapse resistant hose. For example, in heater installations for automobiles the desired hose length requirements may vary considerably and, in addition, the hose is subjected to bending and flexing where flexibility and collapse resistance are requisite. Moreover, the hose must be burst resistant throughout its length to withstand the pressure of the fluid circulated through the hose. An additional factor is, as mention, the fact that the hose will provide at any particular point throughout its length a convenient connection joint for various types of designs of clamping arrangements. For example, as shown in FIGURE 3, it is often desirable to employ a spring-type clamp as designated at 30. The hose may then be cut to the desired length just ahead of the indented area 20 with the clamp receiving section 18 of that indented area being applied over a suitable fitting into the heater and the spring clamp 30 applied to hold the hose in sealed relation to the fitting. Upon application of the clamp, due to the increased thickness of the hose body at this point, the hose will tightly engage the fitting and provide the necessary support for the clamp. Of course the fabric reinforcing layer will contribute to the reinforcement of the hose at this point, so that there is little or no danger of the clamp tending to work through the body of the hose. At the same time, the intermediate indented areas between the connected ends of the hose, together with the rib sections 24, will provide the necessary compressibility or stretchability, whichever is desired to permit the hose to extend the desired length in case the point of division of the hose is not the exact length desired.

Figure 5:
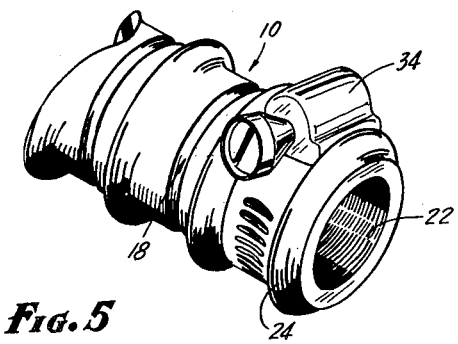
FIGURE 5 shows still another type clamp and a modified way of securing the clamp to the end of the hose in accordance with the present invention.

When a band-type clamp, such as shown at 32 in FIGURE 4, is to be used the hose may be cut at the base of convolution so as to permit the full length of the clamp receiving surface to be available for disposition of the clamp 32 thereon. In this type connection the end of the hose is applied over the fitting, and it will be noted that interconnection is made easily since the inner surface of the hose curves outwardly from the thickened section to enable the user to easily start the hose onto the fitting and to push the thickened section into close engagement with the fitting. Upon application of the clamp 32 the section 18 will then tightly engage the surface of the fitting to prevent any accidental separation of the end of the hose from the fitting. An alternate method of using the band-type clamp is illustrated in FIGURE 5 wherein clamp 34 of the band-type may be disposed between a pair of adjacent convolutions 24, so that the convolutions will operate to hold the clamp securely in place against lateral shifting. In this form, the hose end is separated at the base of the convolution on the side opposite of the clamp receiving section 18 to be employed for disposition of the clamp 34, and again the clamp receiving section is slid over the fitting and the clamp 34 tightened against the surface of the hose to hold the hose end securely in place.

It will be apparent from the foregoing that the hose of the present invention offers many advantages, including ability to make a burst resistant hose of the desired flexibility and collapse resistance wherein the convoluted portions may be spaced apart a sufficient distance to permit the disposition of many different types of clamping arrangements, because the reinforcing layer 14 will act to support and hold the sections between the convoluted portions, yet will not be a deterrent to optimum flexibility of the hose. Also, the indented area which may be utilized for disposition of a spring-type clamp arrangement, as shown in FIGURE 4, also contributes to the flexibility of the hose especially where it is desired to stretch or contract the hose to adapt to changes in length. Moreover, the variation and configuration between the exterior and interior surfaces of the hose contributes to the added flexibility and collapse resistance of the hose, yet maintains a substantially uniform thickness of the hose throughout its length.

Accordingly, it will be understood that various changes and modifications in the details and construction of the hose in the present invention may be made without departing from the scope of the invention as defined by the appended claims.

We claim:
1. A flexible hose member comprising an elongate body of elastomeric material being constituted of clamp receiving sections of cylindrical configuration and rib sections projecting outwardly from said clamp receiving sections, said clamp receiving section having an axial length greater than the axial length of said rib sections, annular clamp receiving grooves disposed in each of said clamp receiving sections intermediate between adjacent rib sections, and the inner surface of said hose tapering outwardly in both directions from the central portion of the clamp receiving section to each rib section to a diameter substantially equal to the external diameter of said clamp receiving sections.

2. A flexible hose member comprising an elongate body of elastomeric material being constituted of alternate clamp receiving sections of cylindrical configuration and rib sections projecting outwardly from said clamp receiving sections, said clamp receiving sections having an axial length greater than the axial length of said rib sections, annular clamp receiving grooves disposed in each clamp receiving section intermediately between the adjacent rib sections, the inner surface of said hose being defined by a succession of convex surface portions, each surface portion curving outwardly from the intermediate portion of each clamp receiving section to the intermediate portions of the next adjacent rib flanking each clamp receiving section and each surface portion terminating at each rib section at a diameter substantially equal to the external diameter of said clamp receiving sections.

3. A flexible hose member according to claim 2 in which each clamp receiving section is of greatest thickness at the location of each clamp receiving groove.

References Cited in the file of this patent

UNITED STATES PATENTS

| | | |
|---|---|---|
| 1,864,861 | Schaller | June 28, 1932 |
| 2,622,623 | Michaudet | Dec. 23, 1952 |
| 2,788,804 | Larkin | Apr. 16, 1957 |
| 2,870,619 | Greczin | Jan. 27, 1959 |
| 2,995,151 | Lockwood | Aug. 8, 1961 |